(No Model.)
J. A. KESSEL.
RUBBER SHOE FASTENER.
No. 318,481. Patented May 26, 1885.
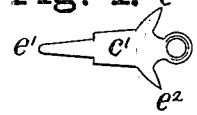
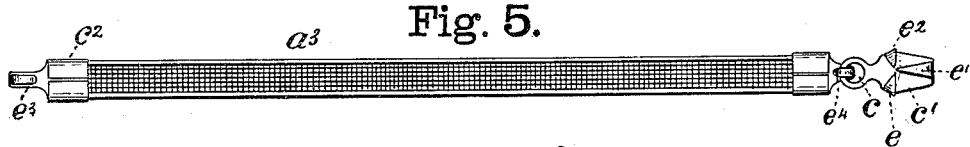
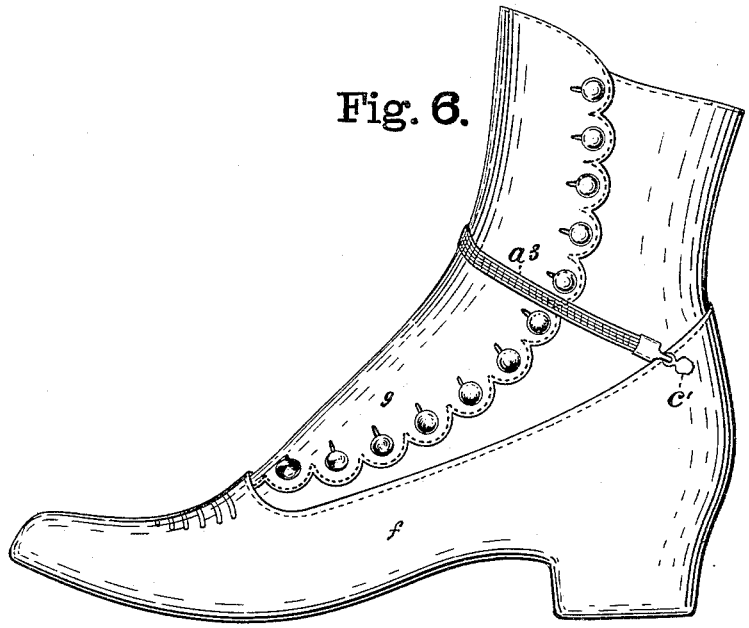
Witnesses.
Jennie M. Caldwell
Hugh Sangster
Inventor.
John A. Kessel,
By James Sangster
atty.
N. PETERS, Photo-Lithographer, Washington, D. C.

United States Patent Office.

JOHN A. KESSEL, OF BUFFALO, NEW YORK, ASSIGNOR TO HIMSELF AND JOHANNA RICHERT, OF SAME PLACE.

RUBBER-SHOE FASTENER.

SPECIFICATION forming part of Letters Patent No. 318,481, dated May 26, 1885.

Application filed February 24, 1885. (No model.)

*To all whom it may concern:*

Be it known that I, JOHN A. KESSEL, a citizen of the United States, residing in Buffalo, in the county of Erie and State of New York, have invented certain new and useful Improvements in Rubber-Shoe Fasteners, of which the following is a specification.

The object of my invention is to provide a simple and efficient means for keeping a rubber shoe from slipping off; and it consists of an elastic cord or band provided with hooks or a suitable connecting device, in combination with a connecting plate or link having a suitable connecting portion, whereby it may be readily and securely connected to the shoe, all of which will be fully and clearly hereinafter shown, described, and claimed by reference to the accompanying drawings, in which—

Figure 1 is an elevation showing the invention connected with an elastic cord. Fig. 2 represents a form of blank suitable for forming the hook portions attached to the elastic cord. Fig. 3 is a blank for forming the hook connection for a flat elastic band. Fig. 4 is a blank for forming the connecting-piece to be fastened to the rubber. Fig. 5 is a flat elastic band and connections. Fig. 6 is a side elevation of a shoe and rubber shoe having my invention connected thereto, and Fig. 7 represents a modification of Fig. 4.

In said drawings, $a$ represents the elastic cord. $a'$ is a hook firmly attached to the cord by taking a blank similar to that shown in Fig. 4 and bending and compressing it in any well-known way around the end of the cord. One end is then formed into a hook, $a'$, and that on the opposite end is formed into an eye, $a^2$, for securing it permanently to the eye $c$ of the plate $c'$, which plate is firmly fastened to one side of the shoe. The opposite side of the shoe is provided with a similar plate. When a flat band, $a^3$, is used, the blank $c^2$ is taken and folded and pressed on so as to hold firmly, as shown in Fig. 5, and one end is formed into the hook $e^3$, and an eye, $e^4$, at the opposite end. The connecting-plate $c'$ is formed with three pointed pieces, $e$ $e'$ $e^2$, which are bent down at right angles to the body of the plate, and are then forced through the rubber and pressed into the form shown in Fig. 5. Being pressed closely it is then secured firmly to the rubber. On one end of the band the plate $c^2$ is formed into a hook, $e^3$, and on the opposite end it is formed into an eye, $e^4$, so as to secure it to the eye in the plate $c'$. There being two plates, $c'$—one to permanently fasten to one side of the rubber and one for the opposite side, and one having the band secured to it—all that is necessary to do in using the device is to put the rubber on and bring the free end of the elastic band around over the front part of the foot and hook it into the eye of the plate.

In Fig. 7 I have shown a modified construction of the plate $c'$. The portion for connecting with the shoe is in the form of an eyelet portion, $e^5$. With this construction the shoe is first perforated and the part $e^5$ inserted and pressed down by the usual instrument for forming and pressing an eyelet, and, if desired, the ordinary eyelets may be used and secured to the shoes in the usual way, and the elastic strap, having the plate provided with a hook at each end, may be hooked into them, as will be readily seen.

I claim as my invention—

An elastic band or cord having a metallic hook at each end, substantially as specified, in combination with the eye portions $c'$, having the sharp-pointed projections $e$ $e'$ $e^2$, adapting them to be readily attached to the sides of a rubber shoe, substantially as and for the purposes described.

JNO. A. KESSEL.

Witnesses:
JENNIE M. CALDWELL,
JAMES SANGSTER.